(12) United States Patent
Kodama et al.

(10) Patent No.: US 7,007,397 B2
(45) Date of Patent: Mar. 7, 2006

(54) LENGTH MEASURING APPARATUS

(75) Inventors: Kazuhiko Kodama, Utsunomiya (JP); Shigeru Oshima, Utsunomiya (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/830,538

(22) Filed: Apr. 23, 2004

(65) Prior Publication Data
US 2004/0211078 A1    Oct. 28, 2004

(30) Foreign Application Priority Data
Apr. 24, 2003 (JP) .............................. 2003-119315

(51) Int. Cl.
*G01B 21/16* (2006.01)
(52) U.S. Cl. ......................................... 33/706; 33/702
(58) Field of Classification Search .......... 33/702–708, 33/783–784, 791–792
See application file for complete search history.

(56) References Cited

U.S. PATENT DOCUMENTS

| | | | | |
|---|---|---|---|---|
| 4,444,504 A | * | 4/1984 | Takizawa | 33/706 |
| 4,835,830 A | * | 6/1989 | Miller | 33/702 |
| 4,982,508 A | * | 1/1991 | Nelle et al. | 33/702 |
| 5,065,525 A | * | 11/1991 | Szenger | 33/702 |
| 5,095,637 A | * | 3/1992 | Kraus | 33/702 |
| 6,070,337 A | * | 6/2000 | Wallrafen | 33/708 |
| 6,105,271 A | * | 8/2000 | Freitag et al. | 33/706 |
| 6,349,481 B1 | * | 2/2002 | Nelle | 33/702 |
| 6,442,861 B1 | * | 9/2002 | Boge et al. | 33/706 |
| 6,564,468 B1 | * | 5/2003 | Blattner et al. | 33/706 |
| 6,675,491 B1 | * | 1/2004 | Ooyama et al. | 33/706 |
| 6,766,587 B1 | * | 7/2004 | Kawada | 33/702 |
| 6,865,820 B1 | * | 3/2005 | Burgschat et al. | 33/706 |
| 6,904,696 B1 | * | 6/2005 | Boge et al. | 33/706 |
| 2005/0108888 A1 | * | 5/2005 | Burgschat et al. | 33/706 |

FOREIGN PATENT DOCUMENTS

JP    05-269650    10/1993

\* cited by examiner

*Primary Examiner*—Christopher W. Fulton
(74) *Attorney, Agent, or Firm*—Rankin, Hill, Porter & Clark LLP

(57) ABSTRACT

A main scale is firmly bonded to a metal tape having a desired coefficient of linear expansion by a powerful adhesive. At the same time, the metal tape is fixed to a frame by a two-sided adhesive tape so as to be capable of expansion and contraction. A length measuring apparatus is provided, wherein a scale material which is unstable with respect to variations in temperature and humidity is stabilized, thereby achieving a desired coefficient of linear expansion.

4 Claims, 3 Drawing Sheets

LENGTH MEASURING APPARATUS

CROSS-REFERENCE TO RELATED APPLICATION

The disclosure of Japanese Patent Applications No. 2003-119315 filed Apr. 24, 2003 including specifications, drawings and claims is incorporated herein by references in their entireties.

BACKGROUND OF THE INVENTION

1. Field of the Invention

The invention relates to a length measuring apparatus having a scale held on a frame, and a length measuring apparatus of a type in which the scale is attached directly to an object to be measured. In particular, the invention relates to a length measuring apparatus which is suitably used with a linear displacement measuring instrument, such as a linear scale, a vernier caliper, and an end-measuring unit, as well as a microscope and an image measuring machine. The length measuring apparatus shall have a scale structure by which the material of the scale can be stabilized for a desired coefficient of linear expansion when a printed circuit board or the like having low stability with respect to variations in ambient temperature and humidity is used as the material.

2. Description of the Related Art

Some length measuring apparatuses use printed circuit boards as their scales. An example thereof is an electromagnetic induction type vernier caliper which uses a printed circuit board having a number of coils printed thereon as a scale. Such length measuring apparatuses adopt the structure that the printed circuit boards, being unstable with respect to variations in ambient temperature and humidity, are firmly pasted onto stainless steel or other metals having higher stability.

Japanese Patent Laid-Open Publication No. Hei 5-269650 describes a technique of attaching a main scale made of glass to a frame through the intervention of an elastic material so as to absorb a difference in thermal expansion between the main scale and the frame.

In the former structure, however, stainless steel and other metals having high shape stability are hard to work, and will cost much if a wide range of length measurement is desired. Besides, the metal work itself is impossible when a frame having a complicated shape capable of protecting the scale from foreign particles is intended. Such a complicated shape may be obtained by using an aluminum extrusion which is used as the frame of a linear scale or the like. There have been problems, however, because if a print circuit board is firmly pasted thereoto simply, the thermal expansion is dominated by the coefficient of linear expansion of aluminum ($23 \times 10^{-6}$), failing to provide the coefficient of linear expansion of iron (approximately $11 \times 10^{-6}$) which is close to the coefficients of thermal expansion of objects to be measured such as a machine tool.

In the latter technique described in Japanese Patent Laid-Open Publication No. Hei 5-269650, it has been impossible to enhance the stability of the scale itself as in the case where a printed circuit board is used as a scale.

Moreover, there has been no scale available which is free from the influence of thermal expansion of the object to be measured and has stability with respect to variations in temperature and humidity, even in the case of pasting a scale directly onto an object to be measured, nor a method of attaching the same.

SUMMARY OF THE INVENTION

The present invention has been achieved to solve the conventional problems described above. It is thus an object of the present invention to stabilize a scale material which is unstable with respect to variations in temperature and humidity, thereby achieving a desired coefficient of linear expansion.

The present invention has solved the foregoing problems by the provision of a length measuring apparatus having a scale held on a frame, the apparatus comprising: a linear expansion determination member having a desired coefficient of linear expansion; bonding means for bonding the scale onto the linear expansion determination member firmly; and elastic fixing means for fixing the linear expansion determination member to the frame so as to be capable of expansion and contraction.

The present invention has also solved the foregoing problems by the provision of a length measuring apparatus of a type in which a scale is attached directly to an object to be measured, the apparatus comprising: a linear expansion determination member having a desired coefficient of linear expansion; bonding means for bonding the scale onto the linear expansion determination member firmly; and elastic fixing means for fixing the linear expansion determination member to the object to be measured so as to be capable of expansion and contraction.

Here, the linear expansion determination member may be made of a metal tape having the same coefficient of linear expansion as that of the object to be measured, so that the member can be configured at a low price.

Alternatively, the linear expansion determination member may be made of a glass plate or ceramic plate having the same coefficient of linear expansion as that of the object to be measured.

The bonding means may be an epoxy type or cement type adhesive which forms a thin adhesive layer. The elastic fixing means may be a two-sided adhesive tape or a silicon type adhesive which forms a thick adhesive layer.

According to the present invention, it is possible to improve the stability of the scale and give a desired coefficient of linear expansion thereto.

BRIEF DESCRIPTION OF THE DRAWINGS

The above object, features and advantages of the present invention, as well as other objects and advantages thereof, will become more apparent from the description of the invention which follows, taken in conjunction with the accompanying drawings, wherein like reference characters designate the same or similar parts and wherein.

DETAILED DESCRIPTION OF THE PREFERRED EMBODIMENTS

Hereinafter, embodiments of the present invention will be described in detail with reference to the drawings.

Figure 1:
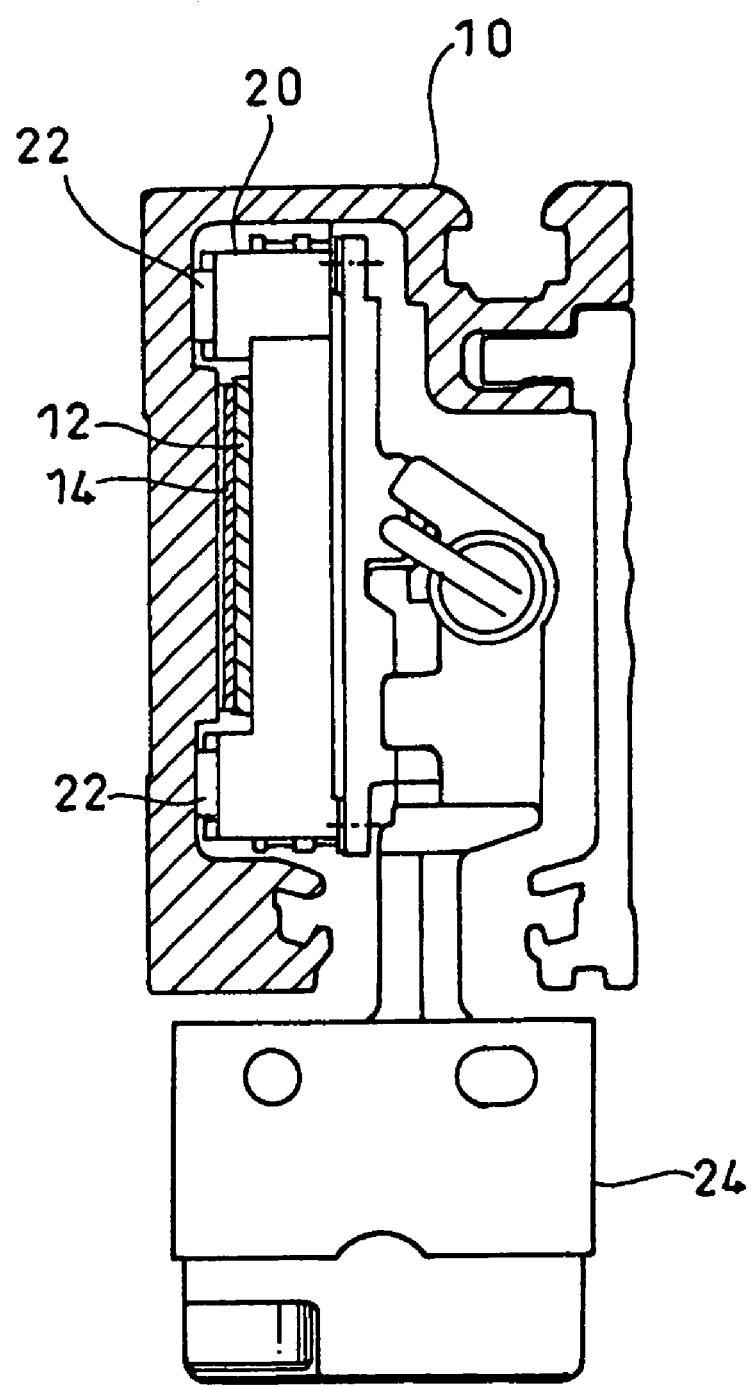
FIG. 1 is a cross-sectional view showing an entire scale according to a first embodiment of the present invention.
Figure 2:
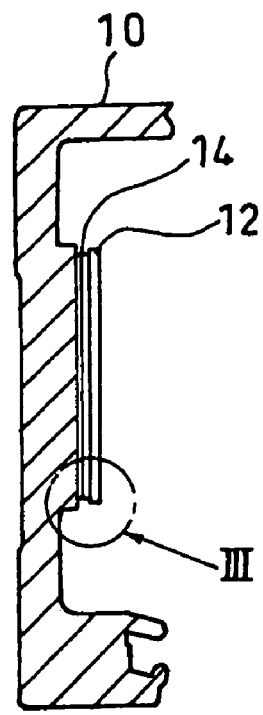
FIG. 2 is a cross-sectional view showing essential parts of the same embodiment.
Figure 3:
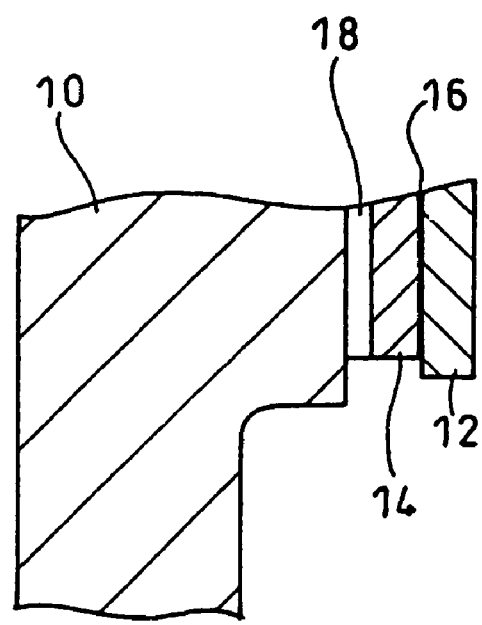
FIG. 3 is an enlarged cross-sectional view of the area III in FIG. 2.

A first embodiment of the present invention is shown in FIG. 1 (a cross-sectional view of the entire scale), FIG. 2 (a cross-sectional view of essential parts), and FIG. 3 (an enlarged cross-sectional view of the area III in FIG. 2). The present embodiment is a linear scale having a main scale 12 which is held on a frame 10 to be attached to one side of an object to be measured. The main scale 12 is made of a printed circuit board such as a copper-clad laminate of glass fabric based epoxy resin (so-called glass epoxy board). The linear scale comprises a metal tape 14, a powerful adhesive 16, and a two-sided adhesive tape 18. The metal tape 14 has a desired coefficient of linear expansion (for example, the coefficient of linear expansion of iron). The powerful adhesive 16 has a high adhesive force and forms a thin adhesive layer for bonding the main scale 12 to the metal tape 14 firmly. An example thereof is an epoxy type or cement type adhesive. The two-sided adhesive tape 18 fixes the metal tape 14 to the frame 10 so as to be capable of expansion and contraction, forming a thick adhesive layer of high elasticity.

In the diagram, the reference numeral 20 represents a slider which moves in the longitudinal direction of the main scale 12 (the measuring direction perpendicular to the plane of the diagram) while maintaining a predetermined distance to the surface of the main scale 12, for example, via slide shoes 22. For example, a detector including an index scale, a light source, and a photo detector device is mounted on the slider 20. The reference numeral 24 represents a detection head which is mounted on the other side of the object to be measured and conveys the movement of the same to the slider 20.

In this way, the unstable main scale 12 is tied to the metal tape 14 of high stability by means of the powerful adhesive 16 which forms a thin adhesive layer and has a high adhesive force. The main scale 12 thus exhibits stable behavior with respect to temperature and humidity.

Besides, the two-sided adhesive tape 18 which forms a relatively thick adhesive layer and has high elasticity is interposed between the frame 10 and the metal tape 14, constituting a relief structure for thermal displacement. Consequently, even if the frame 10 is made of aluminum extruded material or other material having a coefficient of thermal expansion different from that of the metal tape 14, the temperature-displacement characteristic of the main scale 12, or the length measuring apparatus, is dominated by the metal tape 14. It is therefore possible to select the metal tape 14 for the same material as that of the object to be measured, so that the main scale 12 has the same coefficient of linear expansion as that of the object to be measured.

Here, the linear expansion determination member (the metal tape 14 in this case) desirably has a rigidity at least 10 times higher than that of the scale (the main scale 12 in this case) in view of satisfying the required measuring accuracy.

According to the present embodiment, the use of the metal tape 14 of simple shape allows inexpensive configuration.

Next, description will be given in detail of a second embodiment of the present invention, or an application to a length measuring apparatus of a type in which the scale is attached directly to an object to be measured.

Figure 4:
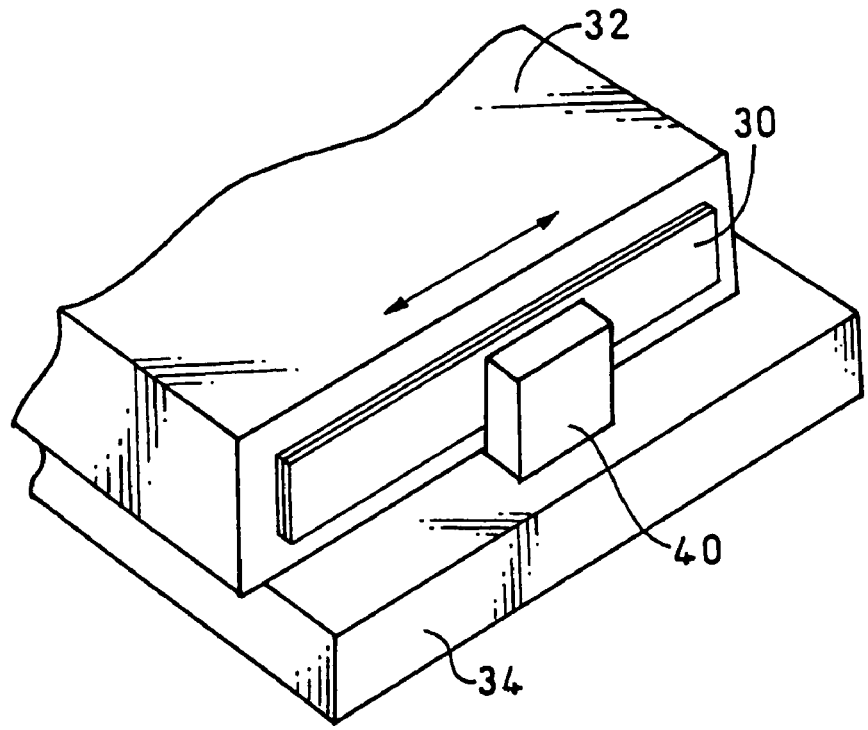
FIG. 4 is a perspective view showing essential parts according to a second embodiment of the present invention.
Figure 5:
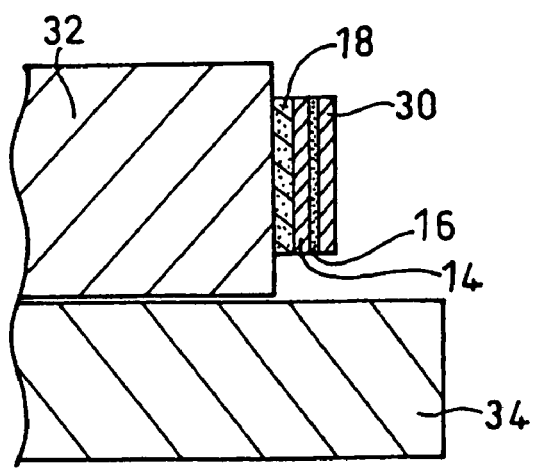
FIG. 5 is a cross-sectional view of the same.

The present embodiment is shown in FIG. 4 (a perspective view of essential parts) and FIG. 5 (a cross-sectional view of the same). Here, an unstable scale board 30 is, firmly bonded to a metal tape 14 by means of the same powerful adhesive 16 as in the first embodiment. A two-sided adhesive tape 18 elastically fixes the metal tape 14 to a stage 32 which is made of glass or ceramic, for example. In the diagram, the reference numeral 34 represents a stage base, and 40 a detection head.

Microscopes and image measuring machines often use such an XY stage of glass, or a stage of ceramic sometimes. To make the coefficient of linear expansion of the scale the same as that of the stages, the metal tape 14 may be replaced with a glass plate or a ceramic plate depending on the material of the stage.

The means for bonding the main scale 12 and the metal tape 14 firmly is not limited to the powerful adhesive 16. Bolting is also applicable.

The elastic fixing means for fixing the metal tape 14 to the frame 10 or the stage 32 so as to be capable of expansion and contraction is not limited to the two-sided adhesive tape 18, either. For example, a silicon type adhesive may be used.

The materials of the main scale 12 and the scale board 30 are not limited to the glass epoxy boards, either. Instead, it is possible to use a flexible printed circuit board (FPC) made of a polyimide laminate which is thin, flexible, and susceptible to temperature and humidity. Other materials available include: resin tapes intended for video tapes and the like, which are extremely inexpensive and very typical; BT resin used for buildup substrates which is expensive; and paper base phenol which is inexpensive.

The scale of the electromagnetic induction type length measuring apparatus can be formed by arranging a number of coils by a buildup method, which provides higher stability with respect to variations in temperature and humidity as compared to glass epoxy boards. However, it is insufficient for required measuring accuracy. Then, a scale that satisfies the required accuracy can be formed only through the pasting of the linear expansion determination member according to the present invention.

A scale having a scale pattern (of coil configuration or plate configuration) can also be formed through printing on a fairly typical resin tape of extremely low price intended for video tapes and the like. In this case, the scale can be fabricated at extremely low price. Again, the linear expansion determination member must be pasted to satisfy the required accuracy.

Although certain preferred embodiments have been shown and described, it should be understood that many changes and modifications may be made therein without departing from the scope of the appended claims.

What is claimed is:

1. A length measuring apparatus having a main scale held on a frame, the apparatus comprising:
    a metal tape having a coefficient of linear expansion that is identical to a coefficient of linear expansion of an object to be measured;
    bonding means for firmly bonding the main scale onto the metal tape; and
    elastic fixing means for fixing the metal tape to the frame so as to be capable of expansion and contraction.

2. The length measuring apparatus according to claim 1, wherein
    the bonding means is an epoxy type or cement type adhesive which forms a thin adhesive layer, and the elastic fixing means is a two-sided adhesive tape or a silicon type adhesive which forms a thick adhesive layer.

3. A length measuring apparatus of a type in which a main scale is attached directly to an object to be measured, the apparatus comprising:

a metal tape having a coefficient of linear expansion that is identical to a coefficient of linear expansion of an object to be measured;

means for bonding the scale onto the metal tape firmly; and elastic fixing means for fixing the metal tape to the object to be measured so as to be capable of expansion and contraction.

4. The length measuring apparatus according to claim 3, wherein the bonding means is an epoxy type or cement type adhesive which forms a thin adhesive layer, and the elastic fixing means is a two-sided adhesive tape or a silicon type adhesive which forms a thick adhesive layer.

* * * * *